3,466,181
HEAT AND LIGHT GLARE REDUCING
COMPOSITION FOR GLASS
William H. Cooley, 1228 Westmoor Road, Winnetka, Ill.
60093, Kenneth C. Allison, 1546 S. Shore Drive,
Crystal Lake, Ill. 60614, and William Colburn, Chicago, Ill.; said Colburn assignor to said Cooley and said Allison
No Drawing. Filed Jan. 11, 1967, Ser. No. 608,492
Int. Cl. C08b 21/00, 27/04
U.S. Cl. 106—189     4 Claims

ABSTRACT OF THE DISCLOSURE

A heat and light glare reducing composition for application to a panel of glass, said composition including as a vehicle a resin material combined with a volatile solvent and finely divided particles of light scattering material dispersed therein, said vehicle on evaporation of said solvent remaining as a relatively dry-non-tacky film holding said particles in fixed position and permitting transmission of light through areas of said film not occupied by said light scattering particles, and said film being removable with a wiping cloth dampened with water or other suitable solvent.

---

The present invention relates generally to a heat and glare reducing composition for application to a panel of glass such as a window, a windshield or the like.

More particularly, this invention is concerned with the provision of a heat and glare reducing composition which can be applied in a liquid state and dried quickly to form a non-tacky film which can be removed easily with a wiping cloth or similar article dampened with water or a suitable solvent, as distinguished from glare reducing coatings of a more permanent nature.

A heat and glare reducing composition embodying the features of this invention accordingly has particular utility where the elimination or reduction of glare from the sun is desired during limited intervals of time in daylight hours. Drivers and passengers of motor vehicles are most likely to be inconvenienced and made uncomfortable by glare and heat from the sun only while the vehicle is exposed to direct rays of bright sunlight. While automobiles of modern design are frequently equipped with windows and windshield of tinted glass to provide a limited degree of glare reduction as well as air conditioning apparatus to eliminate some of the heat that is brought into the automobile from the light of the sun, it has been found desirable to have available, even though only on occasions of relatively short duration, additional glare and heat reducing facilities in the form of a material that can be quickly and easily applied to and removed from the windows and windshield and yet allow for needed visibility.

The present invention aims to provide a coating composition having ingredients which function to reduce glare and heat from the sun by scattering the rays of sunlight which travel in a path intersecting the surface of the window or windshield on which the composition is applied. At the same time such light reflecting or light scattering ingredients are so dispersed throughout the coating as to leave areas of the film which are not occupied by said light scattering ingredients to furnish light transmission portions through which necessary visibility is supplied.

These and other objects of this invention are achieved by incorporating in the composition a vehicle such as a solution of synthetic resinous material in a volatile solvent, and including therein a pigment agent characterized by finely divided reflecting particles of lamellar structure which become oriented upon evaporation of the solvent so that the flat faces of said particles occupy a position effective to reflect and scatter the light rays travelling in a path intersecting the surface of the panel of glass on which the composition is applied so as to block such light rays against entry to the enclosed area which is bounded by such panel of glass while permitting transmission of light through those areas of the panel of glass containing such composition but not occupied by said particles.

In the preparation of a heat and glare reducing composition representing one embodiment of this invention, 3 grams of Gold Bronze Rich Pale No. 450A (Metals Disintegrating Co.) were dissolved in a vehicle of the following composition:

Luxol Fast Black L (Du Pont) _____ gram__ 0.10
PVP/VA I-335 (50% solids) General Aniline Film
  Corp. _____ cc__ 2.5
Isopropanol _____ cc__ 97

This composition was applied over the upper third of a 6 inch by 6 inch square of window glass and allowed to drain by gravity. The thickness of the film after drying was on the order of approximately 0.005 inch. The particle sizes in the gold bronze pigment averaged about 250 mesh, and substantially all the particles were of a flake or lamellar form. When the composition was dry it was relatively hard and non-tacky.

The effectiveness of the resulting film as to reduction of light transmission through the glass having its surface so coated by the film was measured with the use of a light source known as a General Electric Reflector Sun Lamp operated at its rated voltage controlled to give a constant light meter reading. The light passed through a black-lined passageway of square cross section, in which the coated glass specimen was supported in a stationary position, was collected and integrated at a white (MgO coated) hemisphere after passage through the glass specimen. The light so collected and integrated was read with a Gossen light meter. The intensity of light passed through the coated glass specimen (with the uncoated side of the glass facing the light source) was read in comparison with a plain uncoated glass as a "blank." On the basis of this test it was found that the coating allowed 30.8 percent light transmission.

To determine the effectiveness of the coating in reducing the passage of infrared light (radiant heat) the specimen of coated glass was subjected to the same light source as used in the test to determine light transmission properties of the specimen. However, the passageway holding the glass specimen was lined with MgO and the light integrating hemisphere was replaced by a parabolic reflector (also MgO lined). A thermocouple was located at the parabolic focus. This thermocouple was coated with carbon black. On the basis of this test it was found that the coating operated to maintain a temperature of approximately 130 degrees F. as sensed at the thermocouple, while the temperature reached with the same test applied to a specimen of uncoated glass was 158 degrees F.

In another embodiment of this invention the composition comprised 25 grams of Ethocel, 100 c.p.s. (Dow Chemical Co.), 75 grams of isopropanol, and 3 grams of Gold Bronze Rich Pale 450A (Metals Disintegrating Co.). This composition applied to a glass specimen like that in the first described test, was observed in preventing light transmission in the same manner as in said first described embodiment, and a light transmission of 54.2% of that transmitted by an uncoated glass specimen was indicated. The same composition, having the particles of pigment omitted, when applied to a glass specimen and tested for light transmission in accordance with the procedure hereinbefore indicated, gave a reading of 88% of that transmitted by an uncoated glass specimen.

In the examples of a composition embodying the present invention hereinbefore described, lamellar particles of copper, aluminum or other metals, or particles of mica or synthetic or natural pearl may be substituted for the gold bronze particles.

In connection with the application of a heat and glare reducing composition in accordance with the examples given herein, it was noted that in an atmosphere of approximately 70 degrees F. and under moderate relative humidity conditions the film so applied was dried in an interval of five to ten minutes. With the use of a wiping cloth or similar article dampened with water or a suitable solvent, the film was instantly removable.

Vehicles suitable for use in a coating composition as contemplated by this invention may also be prepared from film forming synthetic resins such as methyl cellulose, ethyl cellulose, polyvinyl alcohol, polyvinyl acetate, aqueous dispersions of polyvinyl acetate, polystyrene or the like, polyvinyl pyrrolidone, copolymers of vinyl acetate and vinyl pyrrolidone, or other well known plastic or resinous materials which will form transparent, dry, non-tacky adherent films upon evaporation of compatible solvents or dispersing media. Particularly convenient vehicle compositions are composed of alcoholic solutions of resins which are both alcohol and water soluble, such as the composition described in the first example of a coating composition according to this invention. Where so desired, a coating composition embodying this invention may be packaged in a self-pressurized container with a Freon type propellant and suitable valve for the application of the coating by spraying action. Suitable anti-caking agents, such for example as finely divided wood flour, may also be incorporated in the composition in order to retard caking of the particles which might settle on aging.

It is also apparent that modifications of the invention may be made without changing the spirit thereof, and it is intended that the invention be limited only by the claims appended hereto.

What is claimed is:

1. A heat and light glare reducing composition for application to a panel of clear glass and the like, said composition including as a vehicle a resinous material comprising a 0.5% to 5% solution of vinylpyrrolidone/ vinyl acetate film-forming copolymer combined with isopropanol as a solvent with the resinous material content in the ratio of 2.5 parts to 97 parts of solvent, and 3% content of light scattering particles dispersed in said vehicle, said particles being of a lamellar structure and having an average size of 250 mesh, said vehicle upon evaporation of said solvent remaining as a relatively dry, non-tacky film holding said particles in fixed position so that the flat surfaces thereof occupy a position effective to block light rays travelling in a path intersecting the surface of a panel of glass on which said composition is applied and permitting transmission of light through areas of said film not occupied by said light scattering particles, and said film being susceptible to removal from said panel of glass by rubbing with a dampened wiping cloth.

2. A heat and light glare reducing composition according to claim 1 wherein the chemical description of said resinous material is 30% vinyl pyrrolidone/70% vinyl acetate copolymer.

3. A heat and light glare reducing composition according to claim 1 wherein said light scattering particles are of gold bronze composition.

4. A heat and light glare reducing composition for application to a panel of clear glass and the like, said composition including as a vehicle a solution of ethyl cellulose as a resinous material and isopropanol as a solvent with the resinous material content in the ratio of 25 parts of resin to 75 parts solvent and having 3 parts of gold bronze particles dispersed therein, said particles having an average size of 250 mesh.

References Cited

UNITED STATES PATENTS

| | | |
|---|---|---|
| 2,326,001 | 8/1943 | Ariotti et al. |
| 2,346,624 | 4/1944 | Straus. |
| 2,349,571 | 5/1944 | Cummins. |
| 2,368,161 | 1/1945 | Rubner. |
| 2,561,892 | 7/1951 | Van Wyck. |
| 3,280,061 | 10/1966 | Favreau. |
| 3,336,156 | 8/1967 | Gannon _____ 106—189 |

ALLAN LIEBERMAN, Primary Examiner

U.S. Cl. X.R.

106—193; 117—124, 159; 260—33.4, 41